Oct. 17, 1944.   G. F. SHEPPARD   2,360,521
TRANSMISSION MECHANISM
Filed Feb. 13, 1943   3 Sheets-Sheet 1

INVENTOR
GEORGE F. SHEPPARD
BY Fetherstonhaugh & Co.
ATTORNEYS

Oct. 17, 1944.     G. F. SHEPPARD     2,360,521
TRANSMISSION MECHANISM
Filed Feb. 13, 1943     3 Sheets-Sheet 2

INVENTOR
GEORGE F. SHEPPARD
BY Fetherstonhaugh & Co.
ATTORNEYS

Oct. 17, 1944.  G. F. SHEPPARD  2,360,521
TRANSMISSION MECHANISM
Filed Feb. 13, 1943  3 Sheets-Sheet 3

INVENTOR
GEORGE F. SHEPPARD
BY Fetherstonhaugh & Co.
ATTORNEYS

Patented Oct. 17, 1944

2,360,521

UNITED STATES PATENT OFFICE 2,360,521

TRANSMISSION MECHANISM

George F. Sheppard, Montreal, Quebec, Canada

Application February 13, 1943, Serial No. 475,835

1 Claim. (Cl. 105—131)

This invention relates to transmission mechanism for driving a generator from a railway car axle and has particular reference to that type of axle driven transmission mechanism in which a train of intermeshing gears is employed for transmitting power from the axle to the generator shaft. The principal objections to this type of transmission are (1) noisy operation; (2) excessive vibration; and (3) breakage due partly to faulty gear alignment and partly to heavy stresses imposed on different parts of the mechanism by starting, stopping and reversal shocks.

In one gear-train type of axle transmission mechanism now in use a relatively large bevel gear on the driving axle meshes directly with a relatively smaller bevel gear on a generator driving shaft arranged at right angles to the driving axle. In order to obtain the required gear reduction with this arrangement the gear on the generator driving shaft must be made very small in comparison with the gear on the axle. In this case excessive wear and loosening of the parts, due largely to the great disparity between the size of said gears, inevitably results in excessive vibration, noisy operation and early breakage.

In another type of gear-train axle driven transmission a jack shaft is arranged parallel with the driving axle and is provided with two gears, one meshing with a gear on the driving axle and the other meshing with a gear on a generator drive shaft arranged at right angles to the driving axle. This arrangement permits the necessary gear reduction to be obtained with gears of adequate size but provides an unbalanced drive which is subject to wear due to vibration and unavoidable misalignment of the gears.

In order to overcome some of the objectionable characteristics of the gear-train transmission mechanisms mentioned herein it has previously been proposed to interpose rubber cushioning blocks or bushings between the driving axle and an axle carried sleeve to which the axle gear is fixed, the rubber blocks or bushing being compressed between the axle and sleeve and serving to hold these parts out of direct metallic contact with each other while establishing a driving connection therebetween. This expedient has several important advantages. It eliminates the accurate machining of the inner surface of the sleeve and the accurate fitting of the sleeve to the axle which is necessary when the sleeve and axle are in direct metal-to-metal contact with each other. It also provides a yielding shock absorbing driving connection between the axle and sleeve which reduces the noise and vibration to a considerable extent and also serves as a shock absorbing means which reduces damage to the mechanism due to normal flexing of the axle and to starting, stopping and reversal shocks. It does not, however, eliminate the excessive wear and loosening of the parts which results in eventual breakage of that type of drive in which a relatively large bevel gear on the axle meshes directly with a relatively small bevel gear on the generator shaft arranged at right angles to the axle. Neither does it eliminate the excessive vibration and wear due to the unbalanced condition and unavoidable gear misalignment of that type of drive in which the axle gear drives a single gear on a parallel jack shaft which is provided with a further single gear in driving engagement with a gear on a generator driving shaft arranged at right angles to the axle.

The improved transmission assembly provided by the present invention is the culmination of numerous experiments based on a careful study and analysis of the operating characteristics and defects of the foregoing and other gear-train type transmission mechanism now in use. It comprises a gear casing having side walls thereof rotatably mounted on opposite end portions of an axle-carried sleeve at points equi-distant from the transverse centre of the sleeve. A pair of relatively large spur gears are fixed to the sleeve at points which are equidistant from the transverse centre of the sleeve and from the side walls of the gear casing. Rubber blocks are arranged in compression between the axle and the inner surface of the sleeve and serve to hold these parts out of direct metal-to-metal contact with each other and to establish a resilient shock absorbing driving connection therebetween. The two spur gears on the axle-carried sleeve mesh with two similar but smaller spur gears fixed to a jack shaft which lies parallel with the axle and has its ends journalled in bearings carried by the side walls of the gear casing. A bevel gear fixed to the jack shaft at a point relatively close to the transverse centre of the said shaft meshes with a gevel gear on a generator driving shaft which is arranged so that its central longitudinal axis is aligned or coincides with the central transverse axis of the axle-carried sleeve and the jack shaft. The drive connections between the jack shaft and each of the axle driven spur gears mounted thereon comprise a special form of flexible bearing and bushing assembly consisting of a tube of natural or synthetic rubber which has been stretched between an inner and an outer metal tube and then allowed to return to its original state to provide a yielding shock absorbing drive connection between the two metal tubes, the inner metal tube being carried by a relatively heavy sleeve or hub which is keyed to the jack shaft and the outer metal tube being a driving fit in a central opening provided in the spur gears.

By reason of the particular arrangement of parts described herein my improved gear-train driving mechanism affords a more symmetrical arrangement of the component parts of the gear train which results in a better condition of balance and thereby materially reduces vibration, noise and wear. It also provides a gear drive in which resilient shock absorbing torque transmitting rubber blocks or bushings are arranged at certain critical points where their presence is most effective to absorb starting, stopping and reversal shocks; to take care of normal flexing of the driving axle and associated gear carrying shafts; to ensure quiet operation throughout a long period of service and, in general, to reduce vibration and breakage to a much greater extent than has heretofore been accomplished.

Other advantages and characteristic features of my invention will be more readily understood from the following detailed description taken in connection with the accompanying drawings, in which—

Figure 2:
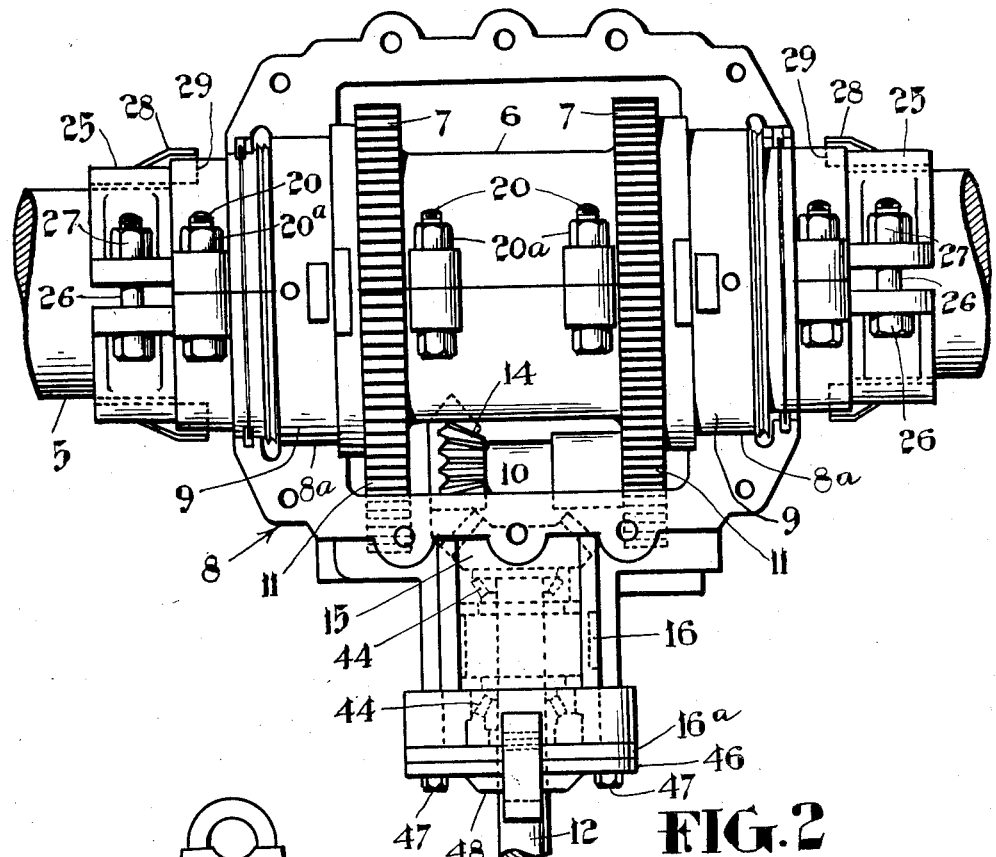
Fig. 2 is a plan view of the transmission assembly as it appears with the upper half of the gear housing removed.
Figure 1:
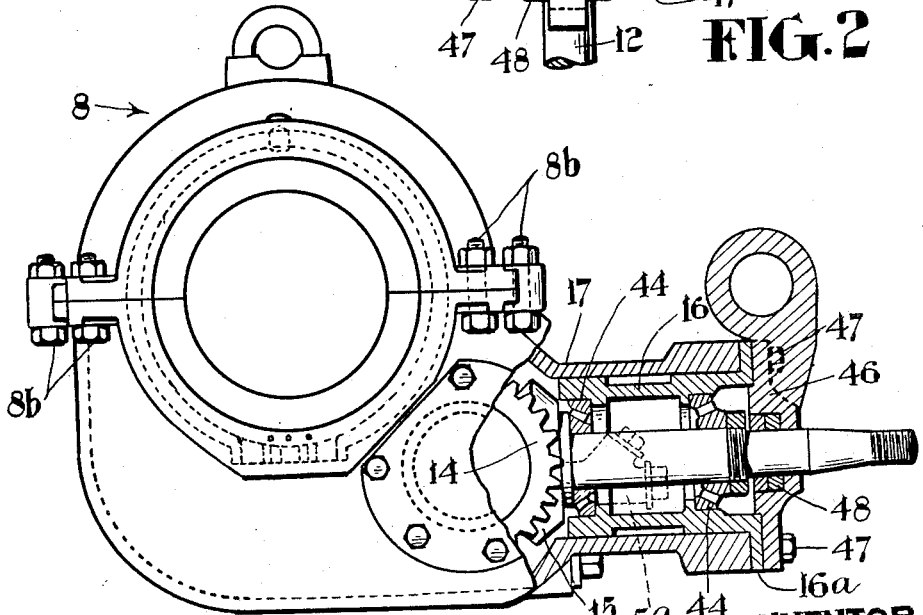
Fig. 1 is a side view, partly in vertical section, of my improved transmission assembly.
Figure 3:
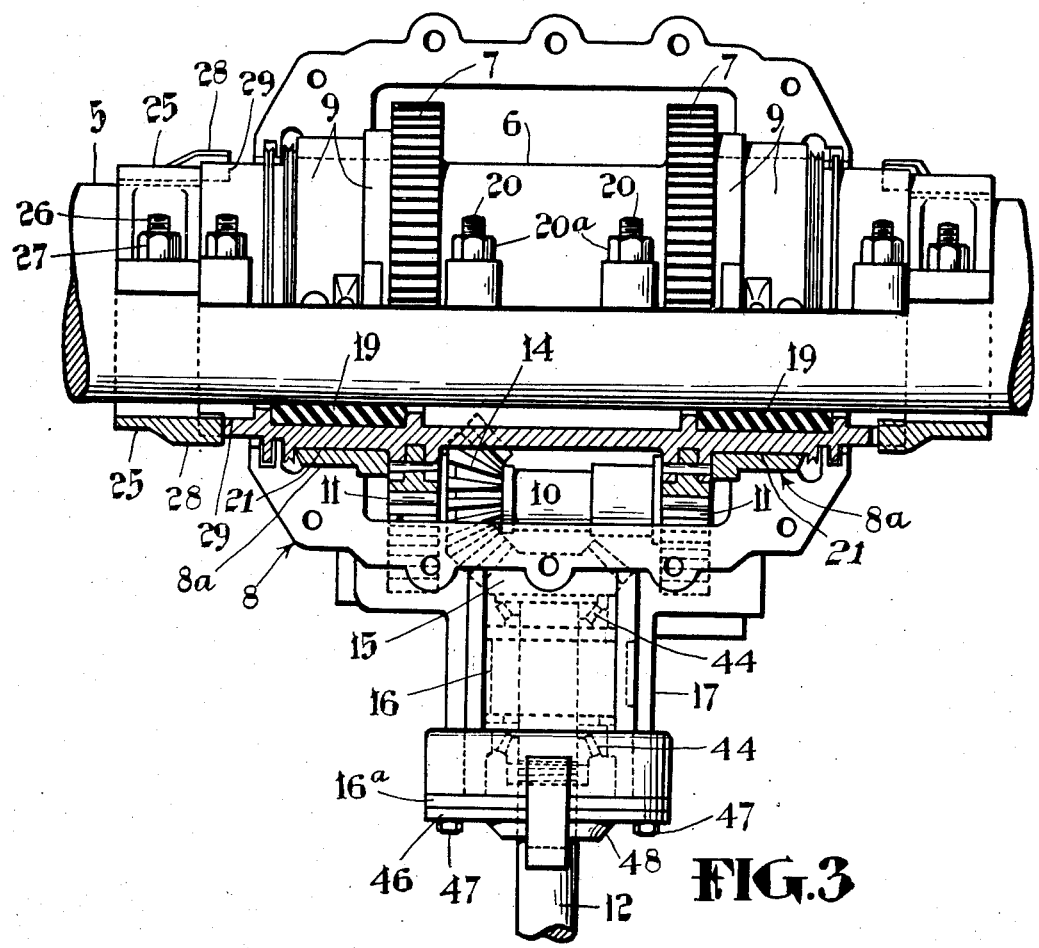
Fig. 3 is a view similar to Fig. 2 but showing certain elements partly in plan view and partly in section.

As shown in the drawings my improved transmission assembly includes a driving axle 5, an axle-carried sleeve 6 provided with two relatively large spur gears 7, a gear casing 8 rotatably mounted on suitable bearing bushings 9 carried by sleeve 6, a jack shaft 10 journalled in casing 8 and provided with two spur gears 11 which are directly driven by the sleeve gears 7, a tail shaft 12 which lies at right angles to the jack shaft 10 and is driven therefrom by two intermeshing gears 14 and 15, said tail shaft extending into casing 8 through a bearing sleeve 16 fitted in the tubular casing extension 17.

Rubber blocks 19 are compressed between axle 5 and sleeve 6 and serve to hold these parts out of direct metal-to-metal contact with each other and to establish a resilient shock absorbing drive connection therebetween. These rubber blocks also serve to prevent impairment of the drive mechanism by normal flexing of the axle 5. Sleeve 6 is longitudinally divided into two halves which are secured together by bolts 20 and clamping nuts 20a. The rubber blocks 19 are force fitted in the sleeve recess 21 and are compressed between the sleeve and the axle when the two halves of the sleeve are fitted around the axle and secured together by the fastening bolts 20 and the clamping nuts 20a.

Driving collars 25 are clamped to the axle 5 at opposite ends of sleeve 6. Each collar comprises two half sections secured together by bolts 26 and clamping nuts 27 and is formed with driving dogs 28 which extend into driving recesses 29 provided in the ends of the sleeve.

Figure 5:
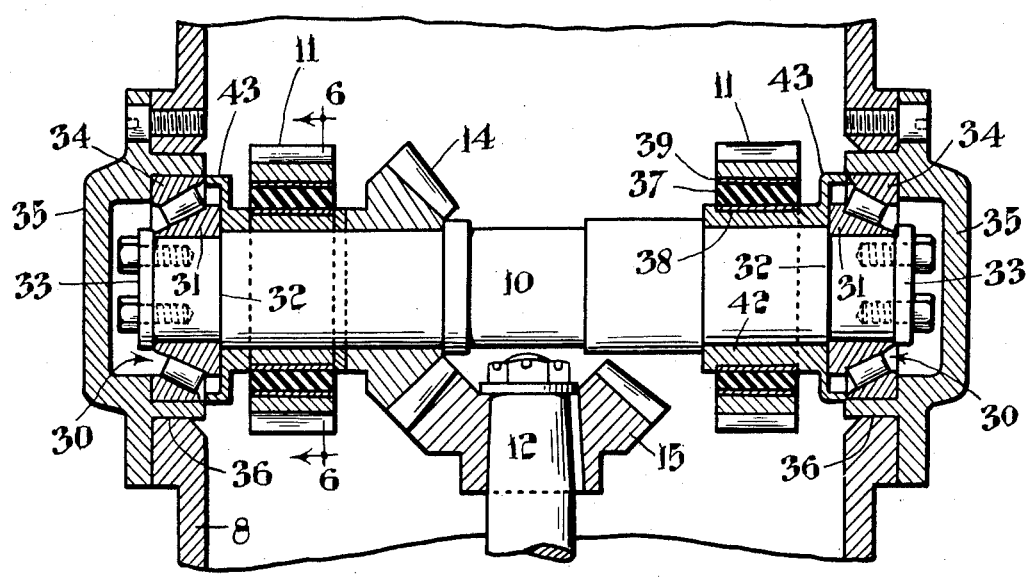
Fig. 5 is a view, partly in section and partly in elevation, of a jack shaft assembly forming part of my improved transmission assembly.
Figure 6:
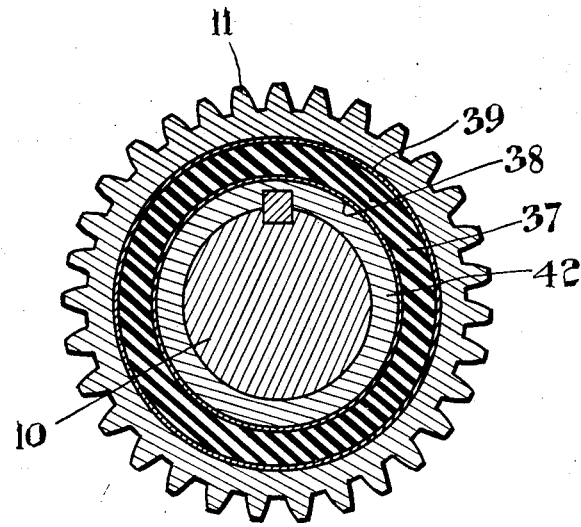
Fig. 6 is a sectional view taken substantially along the line 6—6 of Fig. 5.

The bearing bushings 9 are fitted in side wall openings 8a of casing 8 through which the shaft 5 and sleeve 6 extend. For convenient application and removal casing 8 is divided into two half sections which are bolted together as indicated at 8b. As shown more particularly in Fig. 5, the ends of jack shaft 10 are journalled in roller or other anti-friction bearings 30. The inner race 31 of each bearing is mounted on shaft 10 between a shoulder 32 and a retaining plate 33, the outer race 34 being carried by a cap member 35 which is fastened in place over a side wall opening 36 of casing 8. The bevel pinion 14 carried by jack shaft 10 is keyed directly to said shaft but a resilient shock absorbing drive connection is provided between said shaft and each of the spur gears 11. As here shown the resilient shock absorbing drive connection provided between jack shaft 10 and each spur gear 11 consists essentially of a seamless rubber sleeve 37 which has been stretched between inner and outer metal tubes 38 and 39 and then allowed to seek its original state so that the force constantly exerted by the rubber in seeking to return to its original state provides a resilient shock absorbing driving connection between the metal tubes 38 and 39 which will slip only under high overload conditions.

The outer metal tube 39 is force fitted in the central opening of spur gear 11 while the inner metal tube 38 is force fitted onto a shaft encircling hub or sleeve member 42 which encircles and is keyed to shaft 10, said hub or sleeve member 42 being confined in place by an annular ring-shaped guard member 43 which is keyed to shaft 10 and substantially covers the inner portion of the adjacent shaft bearing 30. This method of mounting the spur gears 11 on the jack shaft 10 serves, in conjunction with the rubber blocks 19 interposed between the axle 5 and sleeve 6, to ensure sufficient resilient shock absorbing capacity at the most critical points of the transmission mechanism where breakage or other damage due to heavy starting and reversal shocks is most likely to occur. The resilient drive connections provided between the jack shaft 10 and the spur gears 11 also serve to give increased protection against damage due to normal flexing of the axle 5 and the jack shaft 10. Damage and noisy operation due to unavoidable gear misalignment is also prevented by the yieldable or cushion mounting of the axle driven sleeve 6 and the jack shaft gears 11.

The bevel pinion 15 is rigidly secured to the tail shaft 12 which is rotatably mounted in the bearing sleeve 16 by roller or other suitable anti-friction bearings 44. The outer end of bearing sleeve 16 is provided with a flange 16a which bears against the outer end of the tubular casing extension 17. A cover plate 46 is fitted to the flange 16a and is secured in place by bolts 47. This cover plate is provided with a packing gland 48 through which the shaft 12 extends.

Figure 4:
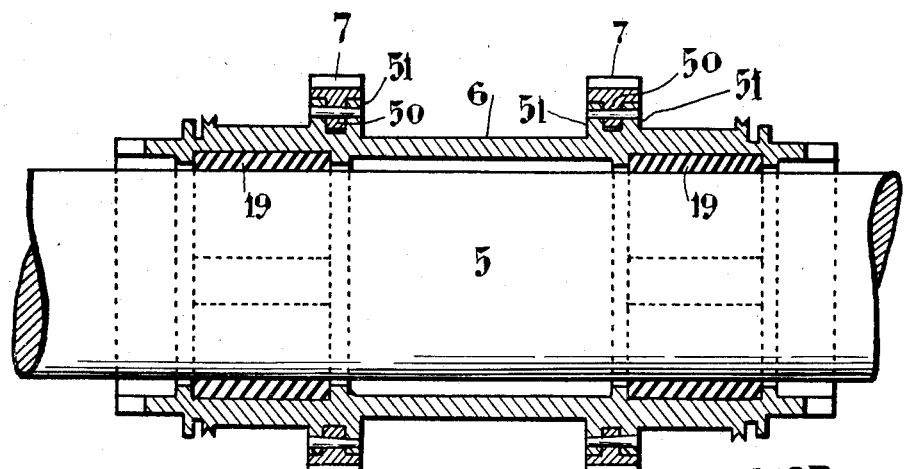
Fig. 4 is a longitudinal sectional view of the axle-carried sleeve forming part of the transmission assembly shown in the preceding figures.

Each gear 7 is, of course, divided into two half sections each carried by one of the half sections of sleeve 6. The gears 7 may be formed integral with or rigidly attached to sleeve 6 or they may be of the replaceable type shown in Fig. 4. In the latter instance each gear includes an attaching flange 50 which is fitted between and fastened to flanges 51 formed integral with the sleeve 6.

The casing 8 is filled, to a predetermined level, with oil which is introduced through any suitable oil supply filling such, for example, as that indicated at 52.

I have found that the benefits of the resilient shock absorbing drive connection provided between axle 5 and sleeve 6, on the one hand, and between jack shaft 10 and gears 11, on the other hand, are not realized to the fullest possible extent when the transmission mechanism, as a whole, is poorly balanced. Accordingly, the transmission mechanism disclosed herein is designed so that it is dynamically balanced, to a much greater degree than the transmission mechanisms heretofore employed, by a symmetrical distribution of the weight of the component parts with reference to the central transverse axis of the axle-carried sleeve 6. In this connection it will be noted that the tail shaft 12 is arranged with its longitudinal central axis coinciding with the transverse central axis of the sleeve 6 and jack shaft 10. It will also be noted that the side walls of the gear casing 8 are symmetrically arranged with reference to both the transverse central axis and the extreme ends of the axle-carried sleeve 6. It will be further noted that the jack shaft 10 is journalled in casing 8 so that its transverse central axis is in line with the transverse central axis of sleeve 6 and with the longitudinal central axis of tail shaft 12. The sleeve gears 7 and the jack shaft gears 11 are also symmetrically arranged at opposite sides of the transverse axes of sleeve 6 and jack shaft 10 and are equi-distant from the adjacent side walls of gear casing 8. The bevel pinion 14 carried by jack shaft 10 is arranged as close to the transverse centre of the jack shaft 10 as possible, the condition of unbalance resulting from the lateral displacement of this bevel gear with reference to the central transverse axis of the sleeve 6 being so slight as to be practically negligible when the condition of dynamic unbalance of the transmission mechanism as a whole is considered.

By virtue of the novel combination of features described herein I have provided a generally improved transmission mechanism which is quiet in operation and will withstand a long period of hard usage without breaking down at any of the critical points where breakage, due to excessive vibration, looseness of parts, etc., usually occurs.

Having thus described what I now conceive to be the preferred embodiment of this invention it will be understood that various modifications may be resorted to within the scope and spirit of the invention as defined by the appended claim.

Having thus described my invention, what I claim is:

An axle driven transmission assembly comprising a railway car axle, a sleeve encircling said axle in spaced relation thereto, resilient shock absorbing means interposed between said axle and sleeve and providing a drive connection therebetween, a gear casing having side walls thereof rotatably mounted on said sleeve at points equidistant from the transverse center of the sleeve, a jack shaft lying parallel with said sleeve and having its ends journalled in bearings carried by said casing so that the transverse centers of the sleeve and jack shaft are in alignment with each other, a tail shaft extending into said casing at right angles to the sleeve and jack shaft so that the longitudinal center of the tail shaft is in line with the central transverse axis of said sleeve and jack shaft, a pair of spur gears fixed to said sleeve to rotate therewith, a second pair of spur gears encircling said jack shaft in spaced relation thereto and meshing with said first mentioned spur gears, resilient shock absorbing means interposed between the jack shaft and each of the spur gears encircling said shaft and providing a drive connection therebetween, said sleeve and jack shaft gears being symmetrically arranged at opposite sides of the central axis of the sleeve and the jack shaft, a bevel pinion fixed to a portion of the jack shaft lying between the jack shaft gears and a bevel pinion fixed to the tail shaft within said casing and meshing with the first mentioned bevel pinion.

GEORGE F. SHEPPARD.